Jan. 20, 1925.

J. WILLIS

METERING AND REGISTERING DEVICE

Original Filed July 21, 1917    2 Sheets-Sheet 1

Inventor
John Willis
By Chas J Williamson
Attorney

Jan. 20, 1925.

J. WILLIS 1,523,796

METERING AND REGISTERING DEVICE

Original Filed July 21, 1917    2 Sheets-Sheet 2

Inventor
John Willis.
By Chas. J. Williamson
Attorney

Patented Jan. 20, 1925.

1,523,796

UNITED STATES PATENT OFFICE.

JOHN WILLIS, OF LANCASTER, PENNSYLVANIA, ASSIGNOR, BY MESNE ASSIGNMENTS, TO MARVIN SMITHEY, OF LAWRENCEVILLE, VIRGINIA.

METERING AND REGISTERING DEVICE.

Application filed July 21, 1917, Serial No. 182,071. Renewed January 18, 1924.

*To all whom it may concern:*

Be it known that I, JOHN WILLIS, a citizen of the United States, and resident of Lancaster, in the county of Lancaster and State of Pennsylvania, have invented a certain new and useful Improvement in Metering and Registering Devices, and do hereby declare that the following is a full, clear, and exact description thereof.

My invention relates to metering and registering apparatus for use with automobiles, employing a large number of odometers or counters which register mileage for making and preserving an accurate account of the mileage of each of the tires as well as the total and trip mileage, and for keeping track on a mileage basis of other matters connected with the operation of the car. It is essential to commercial success that such an instrument be absolutely accurate in its operations, be of a minimum number of parts to enable economical manufacture, which is affected by the number of parts, because of their cost and also by the time and labor required for their assemblage, be as compact or reduced within as simple a compass as possible, because of the limited space available on the car for such a mechanism, and be capable of easy and simple manipulation in making use of it. In making my invention, I have had all these considerations in mind, and it will be found that the mechanism in which I embodied my invention fulfills all the conditions just set forth.

In the accompanying drawings—

Figure 1:
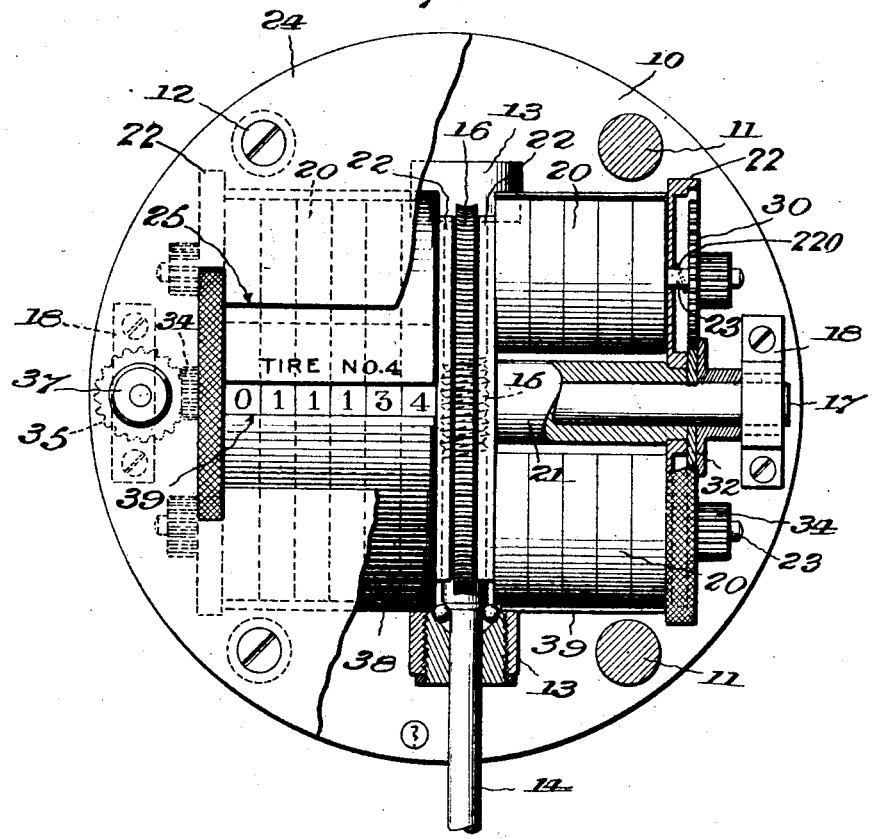
Fig. 1 is a face or front view of a metering and registering mechanism embodying my invention, a portion of the casing being shown broken away.
Figure 2:
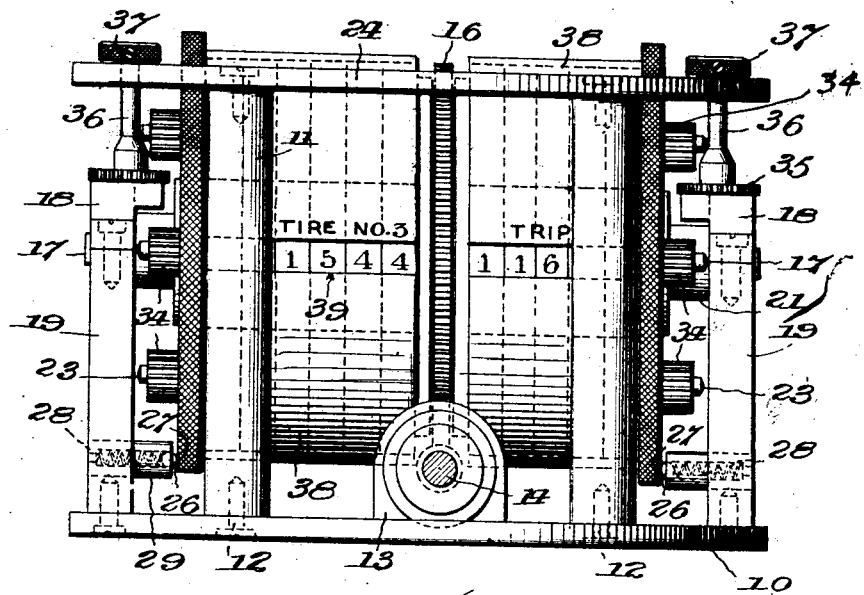
Fig. 2 is a plan view of the instrument looking up from the bottom.
Figure 3:
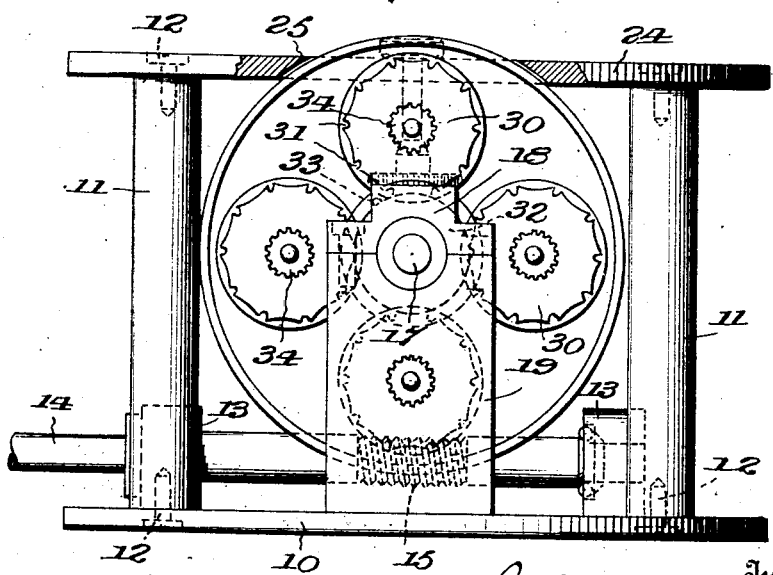
Fig. 3 is an end view, the casing being omitted, and parts being shown in sections.

Briefly described, the instrument shown in the drawings as embodying my invention comprises a large number of odometers or registers and a common operating shaft which is connected with and receives motion from one of the carrying wheels of the car, and the collection of odometers being movably mounted, so that in succession they may be brought into position for reading their registrations. Proceeding now with a description in detail of the construction and arrangement of parts appearing in the annexed drawings, it will be found that the supporting frame work consists of the front and back disk-form plates 10, which are spaced apart by several rods or posts 11 to the opposite ends of which said plates are rigidly secured as by means of headed screws 12. On the inner side of the back plate 10 are bearings 13 (preferably ball bearing) for the vertically arranged driving shaft 14 whose lower end is connected to the usual flexible shaft (not shown) by which driving connection is made with one of the wheels of the car. Said driving shaft 14 is thus located at the back of the instrument. On the shaft 14 is a worm 15 which meshes with a worm wheel 16 of large diameter mounted at mid-length upon a shaft 17 that is journaled at its opposite ends in bearings 18 upon arms or posts 19, that are secured at one end to the back frame plate 10, the shaft 17 thus extending at right angles to the direction of the driving shaft 14.

The odometers or registers 20 are arranged in two circular series or groups on each side of the worm wheel, each series being carried by the flanges of a spool that consists of a sleeve 21 mounted on the shaft 17 and a pair of disks 22 that constitute the spool flanges and which are spaced apart a distance equal to the length of the odometers, and each odometer being mounted on a spindle 23 which is supported in alining holes in the flanges or disks 22. The drawings illustrate each group of odometers as consisting of four but the number may be varied and I, therefore, do not limit myself to any particular number. The arrangement of the odometers in two groups or series, and each series being independent of the other as far as rotating it to bring any one odometer at reading position, enables a large number of odometers to be employed without sacrificing compactness of the instrument. In the face plate, 10 there is a single sight opening 25 for each group of odometers and for rotating each group to bring the odometers thereof in succession opposite their sight opening, the outer spool flange or disk 22 is large enough in diameter so that a portion of it will protrude through a slot in the outer frame plate 10 and a coinciding slot in the dial, so that the thumb or fingers can be applied to the periphery of such protruding portion of said disk for rotating the latter. Its periphery is knurled to prevent slipping of the fingers. Each circular group or series of odometers is yieldingly latched against accidental rotation by a pawl which consists of a ball 26 adapted to engage any one of a series of slight spherical depressions 27 in the side of the knurled disk 22, said pawl being pressed yieldingly against such side of said disk 22 by a coiled spring 28, which together with the ball is mounted in a block 29, carried by the post 19.

Upon the outer end of each odometer spindle 23 is a wheel 30 having in its periphery a series of notches 31 with its periphery between adjacent notches concavely curved to conform to and fit the curvature of the periphery of a wheel or disk 32, keyed to the shaft 17 and having preferably a single tooth 33 which by the revolution of the wheel 32 is brought into engagement with the notches 31 of the wheel 30 as the wheel 32 revolves, the wheels 30 and notches 31 being the well-known Geneva stop gearing. Thus, the driving shaft is called upon to actuate but one odometer mechanism of each group at a time, and hence, the work may be easily done and without serious strain upon the parts involved, and the accidental turning of the odometers in the intervals between their movement by the tooth 33 is efficiently and yet simply guarded against.

Upon each odometer spindle 23 adjacent the wheel 30 thereon is a pinion 34 for cooperation with a toothed wheel 35 on a shaft 36 mounted in bearings in the outer frame plate 10, and in the post 19 and which has on its outer end a turning head 37 for revolving the wheel 35 and constituting a zero resetting device. The pinions 34 of each odometer may be brought in succession into engagement with the wheel 35, and the wheels 30 and 32 being disconnected, the odometer may be reset to zero. This disengagement of the odometer for zero resetting and the meshing of the wheel 35 with a pinion 34 are both produced by the endwise movement of the shaft 36 by pulling on the knob 37. The shaft 36 has a tapering portion which bears against the end of the pinion shaft and moves the same endwise against the pressure of a spring 220 which on the reverse endwise movement of the shaft 36 restores the pinion and associated parts for again driving the odometer.

The odometers shown need not be described in detail, for their construction is a well-known one of the type consisting of a series of numerals-bearing rings mounted side by side and with internal transfer mechanism by means of which, at each revolution of a ring of lower denomination, the adjacent ring of higher denomination will be moved through one-tenth of a revolution.

Each circular series or group of odometers 20 is surrounded by a shell 38 which adjacent each odometer has a slot 39 for revealing the row of numerals along the odometer, and adjacent each slot is inscribed or printed data for identifying or associating each odometer with a particular tire or other part or other operation or other matter in connection with the automobile which it is desired to keep track of.

It will be evident that by my invention, an instrument is provided which has great capacity in respect to the number of odometers employed, yet it is simple of construction, and compact and requires but a minimum of power to operate the odometers, with a minimum of strain upon the moving parts, and it is convenient and easy of manipulation as is required to enable the reading of the registrations of the odometers.

If desired, one or more of the odometers of each group, or either group, may be constructed for hand manipulation instead of automatic operation. The instrument shown in the drawings is not provided with a speed indicator, or speedometer, but one may be employed if desired.

Having thus described my invention what I claim is—

1. An instrument of the class described comprising two groups of registers mounted side by side, independently movable supports for the two groups of registers, a casing having a separate display point for the registers of each group to which the registers in succession may be brought by the movement of the support for such group and a single driving mechanism for the registers of both groups.

2. An instrument of the class described, comprising two groups of registers mounted side by side, independently movable supports for the groups of registers, a face plate over the registers having a sight opening for each group opposite to which the registers are brought in succession by the movement of their support, a single driving shaft, and driving connection between said shaft and the registers of both groups.

3. An instrument of the class described, comprising two circular groups of registers mounted side by side and independently movable, rotatable supports for the groups of registers, a face plate over the registers having a sight opening for each group opposite to which the registers are brought in succession by the movement of their support, a single driving shaft, and driving connection between said shaft and the registers of both groups.

4. An instrument of the class described, comprising two circular groups of registers mounted side by side, a shaft concentric with said groups, a rotatable support for each group mounted on the shaft, a wheel secured to the shaft between the two groups, means for revolving said wheel, and a driving connection between said shaft and the registers of each group.

5. An instrument of the class described, comprising two circular groups of registers mounted side by side, a shaft concentric with said groups, a rotatable spool-form support for each group mounted on the shaft, a wheel secured to the shaft between the two groups, means for revolving said wheel, and a driving connection between said shaft and the odometers of each group.

6. An instrument of the class described, the combination of a frame composed of front and back plates and spacing posts, a driving shaft mounted in bearings on the back plate, two circular groups of registers situated between said plates, a driven shaft passing concentrically through the groups of registers, a rotatable spool-form support for each of said groups of registers, a wheel on said driven shaft, situated between said two groups of registers, and geared to said driving shaft, a driving connection between said driven shaft and the registers, and a face plate having a sight opening for each group of registers, opposite which the registers of each group are brought in succession by the rotation of said spool-form support.

In testimony that I claim the foregoing I have hereunto set my hand.

JOHN WILLIS.